Aug. 27, 1968  K. G. McMILLEN  3,398,649
HYDRAULIC CONTROL SYSTEM
Filed Nov. 16, 1966
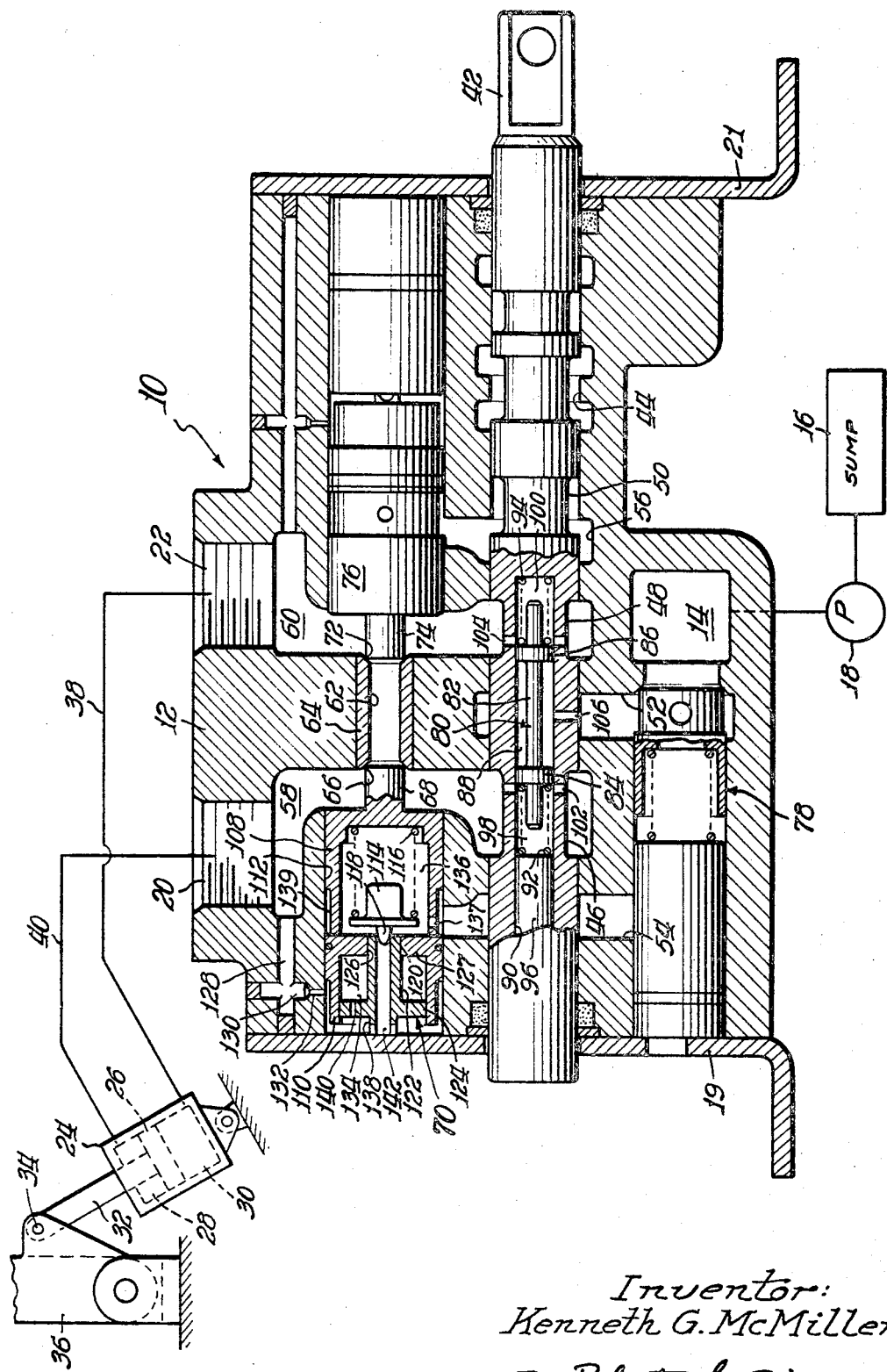
Inventor:
Kenneth G. McMillen
By: Robert L. Zieg  Atty.

United States Patent Office 3,398,649
Patented Aug. 27, 1968

3,398,649
HYDRAULIC CONTROL SYSTEM
Kenneth G. McMillen, Fort Wayne, Ind., assignor to Borg-Warner Corporation, Chicago, Ill., a corporation of Illinois
Filed Nov. 16, 1966, Ser. No. 594,828
7 Claims. (Cl. 91—420)

This invention relates to valves and more particularly to a valve for a hydraulic system including a conventional hydraulic cylinder wherein means are provided for preventing cavitation under dynamic and static conditions and wherein means are provided for damping shock loads in the static condition.

The valve of the present invention is particularly adapted for use with a hydraulic circuit for operating the boom of a tractor back hoe or the like, and is particularly useful in decelerating the boom when the valve is suddenly moved manually to closed position.

Heretofore, valves have been devised for preventing cavitation in hydraulic cylinders in the dynamic condition. Attempts have also been made to dampen shock loads while the hydraulic system is in static condition. These attempts have involved the provision of a valve openable when the pressure of the shock load reaches a predetermined level. Valves of this type have been ineffective at high static working pressures and unworkable throughout a wide pressure range. As a result they have been unresponsive to sudden shock loads with the result that shock is transmitted throughout the entire system.

A primary object of the invention is, therefore, to provide a combined deceleration and decavitation valve which is capable of absorbing pressure surges throughout a relatively wide range of pressures. The valve of the present invention is capable of absorbing shock pressure increases throughout the entire pressure range of the equipment within which it may be installed.

A further object of the invention is to provide a valve in accordance with the preceding object wherein a relief valve is provided which is capable of effecting pressure relief for static pressures in excess of a predetermined value as well as shock pressures within a relatively wide range.

Another object of the invention is to provide a valve in accordance with the preceding objects wherein means are provided for preventing cavitation when the manual valve is in open position.

The invention consists of the novel constructions, arrangements and devices to be hereinafter described and claimed for carrying out the above stated objects as will be apparent from the following description of a preferred form of the invention, illustrated with reference to the accompanying drawing, wherein:

The sole figure is an elevational sectional view of a combined deceleration and anti-cavitation valve made in accordance with the present invention.

Referring now to the drawing, the valve of the present invention is indicated by reference numeral 10 and includes a valve body 12 having an inlet 14 into which fluid under pressure is delivered from a sump 16 by means of a pump 18. The valve body 12 further includes end plates 19 and 21 and inlet/outlet ports 20 and 22. The present valve is shown in association with a hydraulic cylinder 24 which has a piston 26 dividing the interior thereof into a chamber 28 and a chamber 30. Affixed to the piston 26 is a rod 32 pivotally connected at 34 to a boom 36 which may form a part of a back hoe or the like. Counterclockwise movement of the boom 36 may be afforded by introducing fluid under pressure to the chamber 30 through a conduit 38 and exhausted fluid from chamber 28 by a conduit 40. In like fashion, clockwise movement of the boom 36 may be afforded by introducing fluid under pressure to the chamber 38 through the conduit 40 and exhausted fluid from chamber 30 through a conduit 38.

The direction of flow of fluid under pressure is determined by a manual spool valve 42 which is slidably received in an elongated bore 44 in the valve body 12. The spool 42 is formed with circumferentially extending grooves 46, 48 and 50 while the housing body is formed with an inlet passage 52, return passages 54 and 56 which communicate by means of conduits (not shown) with the sump 16 and passages 58 and 60. All of the described passages open into the bore 44 and, as will be appreciated, fluid flows through these various passages as dictated by the positioning of a spool 42, which is illustrated in neutral position. The passage 62 interconnects the passages 58 and 60 and receives a sleeve 64 having at one end thereof a seat 66 for poppet 68 of a deceleration valve 70 and at the other end thereof a seat 72 for poppet 74 of deceleration valve 76 which is identical to the deceleration valve 70.

For movement of the boom 36 in a counterclockwise direction, the spool 42 is moved to the left so as to permit flow of fluid under pressure from the inlet 14, as controlled by a load check 78 of conventional type through passage 52, groove 48, passage 60, outlet port 22 and conduit 38 to chamber 30. At the same time, fluid flows from the chamber 28 through conduit 40, inlet passage 20, passage 58 and groove 46 to the return passage 54.

When clockwise movement of the boom 36 is desired, the spool 42 is moved to the right so that fluid under pressure is delivered to the chamber 28, from the inlet 14 by means of inlet passage 52, groove 46, passage 58, outlet port 20, and conduit 40. At the same time, fluid is exhausted from the chamber 30 by means of conduit 38, port 22, passage 60, groove 48 and return passage 56.

In normal operation, in either the right or the left position of the spool 42, there is a solid high pressure fluid system and a solid low pressure fluid system. Cavitation is, however, possible where external forces are brought to bear on the boom 36. For instance, in the position of the boom 36 illustrated, an external counterclockwise force would tend to pressurize the fluid in the chamber 28 and reduce the fluid pressure in the chamber 30 and additional fluid in the chamber 30 is required. For this purpose, an anti-cavitation shuttle 80 is provided to feed fluid under pressure to the low pressure side. The shuttle 80 includes a spool 82 having a pair of spaced lands 84 and 86 and an elongated groove 88 therebetween. The spool 82 is slidably disposed in an axial bore 90 formed in the left end of the spool 42 and is maintained in the neutral position illustrated by springs 92 and 94 which are loaded by means of the positioning of a plug 96. The spring 92 is locked within a chamber 98 defined in part by the plug 96 and the land 84 while the spring 94 is locked in a chamber 100 defined in part by the land 86 and the right end of the bore 90. Fluid communication is afforded between the chamber 98 and the groove 46 by means of radial openings 102. In like manner, fluid communication between the chamber 100 and the passage 60 is afforded by means of radial openings 104.

In the event of a low pressure condition in the chamber 60 the pressure in the chamber 100 is reduced and the spool 82 moves to the right under the influence of the spring 92 and higher pressure in chamber 98 and pressurized fluid may flow from the inlet passage 52 to the chamber 60 by means of a radial passage 106, the groove 88, and the radial openings 104. A low pressure condition in passage 58 effects a reduction of pressure in the chamber 98 so that the spool 82 moves to the left to uncover the radial openings 102 so that fluid may flow from the inlet passage 52 through radial opening 106 and groove 88.

According to an important feature of the present invention means are provided to afford free fluid communication between the passages 58 and 60 when the spool 42 is in the neutral position illustrated. When the spool 42 is moved to the neutral position sudden inertial forces tend to maintain the boom in motion and produce pressure surges which are detrimental to the entire fluid circuit and may produce undesirable movement of the tractor on which the back hoe may be mounted. Other surge pressures may be developed from other sudden movements of the back hoe.

Damping of pressure surges may be accomplished through the deceleration or relief valves 70 or 76 which are identical. The relief valve 70 will now be described in detail, it being understood that the valve 76 functions in exactly the same manner.

The valve 70 includes a first hollow plunger 108 and a second hollow plunger 110 slidably disposed in abutment each with the other in a bore 112 formed in the housing 12. The plunger 108 is illustrated as being integral with the poppet 68 and has mounted therein a pilot valve 114 normally biased to the closed position illustrated by means of a spring 116. The valve 114 has at the left side thereof a protuberance 118 which rests against a seat 120 formed at the right end of a tube 122 which is integral with a radial flange 124. The flange 124 is slidably disposed within the plunger 110 while the tube 122 is slidably disposed in a central opening 126 in the base 127 of the plunger 110. Fluid communication is afforded between the passage 58 and the bore 112 by means of drilled passages 128, 130, and restricted orifice 132. In the neutral position of the spool 42 a static pressure condition exists in the passage 58, the passages 128, 130, the orifice 132 and the interior of the bore 112, including a chamber 134 within the plunger 110. The plunger 108 has an interior chamber 136 which normally drains to sump through a radial passage 137 which communicates with an external groove 139 and thence to return 54.

When a pressure surge is received in the passage 58 as would be the case when spool valve 42 is suddenly returned to the neutral position after counter-clockwise movement of boom 36, it is transmitted by way of passages 128 and 130 and orifice 132 to the left side of the plunger 110. For this purpose the left side of the plunger 110 is formed with a section of reduced diameter. The flange 124 is normally maintained in spaced relation to end plate 19 by means of a spider 138 and is provided with a restricted orifice 140 through which the chamber 134 is filled. When the pressure surge is received at the left side of the plunger 110, the pressure surge passes through the spider 138 and thence through central bore 142 of the tube 122. Thus the pilot valve 114 is unseated against the pressure of the spring 116 and fluid flow takes place into chamber 136 through passage 137 to return, and through orifice 132, thus a low pressure area (as compared to passage 58) is created to the left of the plunger 110. When this occurs, the plungers 108 and 110 move to the left because the pressure at the right side of the plunger 108 exceeds the pressure at the left end of the plunger 110. As a result, the poppet 68 is unseated and the pressure surge is transmitted through the passage 62 thus forcing the poppet 74 off of seat 72 to be dissipated in the low pressure passage 60 and the remainder of the low circuit. It will be appreciated that the poppet 68 is opened only momentarily because the pilot valve 114 is open for only a brief period of time and because a low pressure condition exists at the left side of the plunger 110 for only a brief period of time.

Once the pilot valve 114 is closed, as will happen as the pressure in passage 58 is lessened and the pressure on the back side of plunger 110 tends to become equalized with that in passage 58, the plungers 108 and 110 again move to the right to close the poppet 68. It will also be appreciated that the flange 124 moves to the right because the total area at its left side exposed to pressure exceeds the area at its right side exposed to pressure. The rate of movement to the right is controlled by the displacing of fluid from chamber 134 through orifice 140 to the left side of flange 124.

The tube 122 assumes a normal static pressure condition with respect to the pilot valve 114 depending upon the level of static pressure. As the tube 122 moves to the right, the pilot valve 114 is moved to the right also and the spring 116 is compressed to an extent depending upon the static pressure level. The rate of movement of tube 122 to the right or the rate of change of pressure setting of valve 114 may be varied by changing the size of orifice 140 or size of chamber 134. The pilot valve will, however, unseat in response to pressure surges regardless of the extent of compression of spring 116. By this arrangement, pressure surges are dampened despite differences in operating static pressure. The present system is operable throughout the entire pressure range of any equipment in which it is installed and the pilot valve 114 will unseat in response to pressure surges at any point within the operating pressure range and dependent on the rate and load of spring 116. As will be apparent the pilot valve will unseat at a pressure surge value in dependence upon the area of the protuberance 118 exposed to the pressure surge as compared to the total area of tube 122 at the left end thereof. These areas may thus be adjusted to obtain the desired amount of pressure surge which will unseat valve 114.

The anti-cavitation shuttle is also effective to take care of excess fluid which may be present in chamber 58 when the manual valve 42 is returned to the neutral position after clockwise movement of the boom 36. Under these conditions high pressure is developed in cylinder port 60 forcing open deceleration valve 76 and then opening valve 70. The amount of fluid displaced from the cylinder chamber 30 is greater than that which the chamber 28 can accept due to the presence of the piston rod 32. A portion of this excess fluid will be removed through the pilot circuit of the deceleration valve 76. Any additional fluid that must be removed will be handled by the anti-cavitation shuttle 80. Upon sensing the high pressure surge in cylinder port 60 through passage 104, shuttle 80 will move to the left thereby communicating passage 106 with passage 102. Excess fluid in port 58 may then flow through passage 102, groove 88, passage 106 into cavity 52. This excess fluid can then bypass the load check valve 78 by escaping through a small hole (not illustrated) on the righthand end or face of check valve 78.

While the control system of the present invention is illustrated in connection with a double-acting hydraulic cylinder, it will be appreciated that a single damping valve, such as valve 70, may be utilized where a single acting cylinder is used, such as for instance, where the load is a vertically disposed bucket and return is made by gravity. In that instance, damping of shock loads may be effected by providing communication between the passage 58 directly to sump, such as for instance through the return passage 56.

Various of the features of the invention have been particularly shown and described; however, it should be obvious to one skilled in the art that various modifications may be made therein without departing from the scope of the invention.

I claim:

1. In a hydraulic control system for a hydraulic work cylinder provided with a slidable piston, means for delivering fluid under pressure to said work cylinder, manual valve means selectively operable to control the flow of fluid to said cylinder, the improvement comprising means for relieving shock pressures in said system when said manual valve means is in closed position, said last named means comprising a normally closed damping valve in fluid communication with one side of said cylinder piston and openable in response to a shock load to provide free fluid communication between one side of said cylinder piston and a low fluid pressure zone, said damping valve comprising a body, a bore formed in said body, a hollow plunger including a normally closed poppet slidably disposed within said bore, a seat for said poppet, a pilot valve mounted within said plunger, a spring normally biasing said pilot valve to closed position, said pilot valve being openable in response to a sudden pressure increase to create a low pressure zone at one side of said plunger to afford movement of said poppet away from its seat and means for increasing the loading of said spring in response to an increase of static fluid pressure at said one side of said cylinder piston.

2. A hydraulic control system in accordance with claim 1 wherein said hydraulic cylinder is double-acting and including means providing fluid communication between one side of said cylinder piston and the other side thereof when said poppet opens.

3. A hydraulic control system in accordance with claim 1 wherein a pair of passages are formed in said valve body each communicating with one side of said cylinder piston and means wherein communication is afforded between said passages when said poppet is opened.

4. A hydraulic control system in accordance with claim 1 wherein means are provided for directing fluid under shock load pressure to unseat said pilot valve and provide for fluid flow thus creating the low pressure zone at one side of said plunger.

5. A hydraulic control system in accordance with claim 4 wherein a second slidable plunger is provided within said bore, wherein a tube having a radial flange is slidably disposed in said second plunger and wherein the end of said tube forms a seat for said pilot avlve.

6. A hydraulic control system in accordance with claim 4 wherein means are provided for emptying the interior of said first named plunger.

7. A hydraulic control system in accordance with claim 5 wherein said tube seats against said pilot valve regardless of the level of static pressure, wherein said spring loading is thus varied as a function of static pressure, and wherein unseating of said poppet may be effected throughout a wide range of static pressures.

References Cited
UNITED STATES PATENTS

| | | | |
|---|---|---|---|
| 3,213,762 | 10/1965 | Dubuf | 91—451 |
| 3,250,185 | 5/1966 | Tennis et al. | 137—596.2 |
| 3,194,261 | 7/1965 | Tennis | 91—437 X |
| 3,313,316 | 4/1967 | Thomas | 91—437 X |

MARTIN P. SCHWADRON, *Primary Examiner.*

CARROLL B. DORITY, *Assistant Examiner.*